United States Patent [19]

Iwaki et al.

[11] Patent Number: 4,469,966
[45] Date of Patent: Sep. 4, 1984

[54] ELECTRIC GENERATOR FOR USE WITH VEHICLES

[75] Inventors: Yoshiyuki Iwaki; Akio Matsumoto, both of Hyogo, Japan

[73] Assignee: Mitsubishi Denki Kabushiki Kaisha, Tokyo, Japan

[21] Appl. No.: 437,050

[22] Filed: Oct. 27, 1982

[30] Foreign Application Priority Data

Oct. 28, 1981 [JP] Japan ................................ 56-173547

[51] Int. Cl.³ .............................................. H02K 9/06
[52] U.S. Cl. ...................................... 310/62; 310/63; 310/68 D; 310/113
[58] Field of Search .................... 310/58, 62, 63, 105, 310/59, 68 R, 68 D, 113; 318/140; 290/52

[56] References Cited

U.S. PATENT DOCUMENTS

| 2,154,279 | 4/1939 | Muller | 310/140 |
| 3,566,168 | 2/1971 | Matsubara | 310/62 |
| 3,602,747 | 8/1971 | Stroppa | 310/114 |
| 3,845,337 | 10/1974 | Jaeschke | 310/62 |
| 4,118,646 | 10/1978 | Fleming | 310/62 |

FOREIGN PATENT DOCUMENTS

| 1061426 | 7/1959 | Fed. Rep. of Germany | 310/113 |
| 298264 | 7/1954 | Switzerland | 310/113 |

Primary Examiner—R. Skudy
Attorney, Agent, or Firm—Sughrue, Mion, Zinn, Macpeak and Seas

[57] ABSTRACT

An electric generator is improved in its cooling capacity at low speeds by driving the fan at a speed which is a multiple of the generator speed. This is effected by mounting the fan blade on a rotor of a three phase induction motor which is driven by a part of the three phase output of the generator.

6 Claims, 5 Drawing Figures

ELECTRIC GENERATOR FOR USE WITH VEHICLES

BACKGROUND OF THE INVENTION

This invention relates to an improvement in the cooling performance of an electric generator for use with vehicles and, more specifically, to the simplification of such structure by separating a cooling fan from the rotor of the generator. In general, in generators for use with vehicles, since the rotor is driven from the engine or the like and a cooling fan for the generator is secured to the rotor, the cooling fan rotates at the same speed at the rotor. Accordingly, it is required to restrict the power of the engine at a low speed area, since the cooling air is insufficient in this area. Further, since the fan is secured to the rotor, there is a restriction in the locating of components such as the rectifier and voltage regulator.

FIG. 1 shows a conventional embodiment of an AC generator for use with vehicles, in which are shown a rotor 1, field coils 1a, a rotary shaft 11 for the rotor, a stator 2 disposed opposed to the rotor by a slight radial gap and having armature coils 2a in which a three phase AC output is induced, bearings 31, 32 provided on either side for rotatably supporting the rotary shaft 11, brackets 41, 42 disposed on either side, respectively, a pulley 5 mounted at the end of the shaft 11, a cooling fan 6 secured to the end of the shaft 11 opposite the pulley, a cup-shaped cover 7 mounted to the bracket 42 and having a vent hole 71, a rectifier 91 for rectifying the three phase AC output and a voltage regulator 92 for regulating the three phase AC output. The position and mounting of the rectifier 91 and the voltage regulator 92 will, as known to those skilled in the art, vary in accordance with the component dimensions and the available mounting space.

The operation of the conventional apparatus will now be explained. The rotor 1 is driven by way of the pulley 5 from an engine or the like (not shown), by which three phase AC power is generated from the stator 2. Since the rotor 1 and the stator 2 generate heat due to ohmic losses, the cooling fan 6 secured to the rotor 1 supplies cooling air for carrying off the heat. The passage of the cooling air is as shown by arrows. Since the amount of cooling air is in proportion to the rotational speed of the cooling fan 6, a sufficient amount of cooling air cannot be supplied at low speed operation of the generator. Further, as can be seen from FIG. 1, available mounting locations for the rectifier 91 and voltage regulator 92 are limited for it is necessary to arrange the rectifier 91 and the voltage regulator 92 so as to not be in contact with the shaft 11 of the rotor securing the fan 6. This causes a restriction in the utilization of space. FIG. 2 schematically shows the restricted area, in which the hatched area is a utilizable range.

SUMMARY OF THE INVENTION

The object of this invention is to overcome the foregoing disadvantages by providing a generator for use with vehicles, wherein the fan is mounted on a shaft separate from the input and forming the rotor of an induction motor.

DETAILED DESCRIPTION OF THE PREFERRED EMBODIMENT

Figure 1:
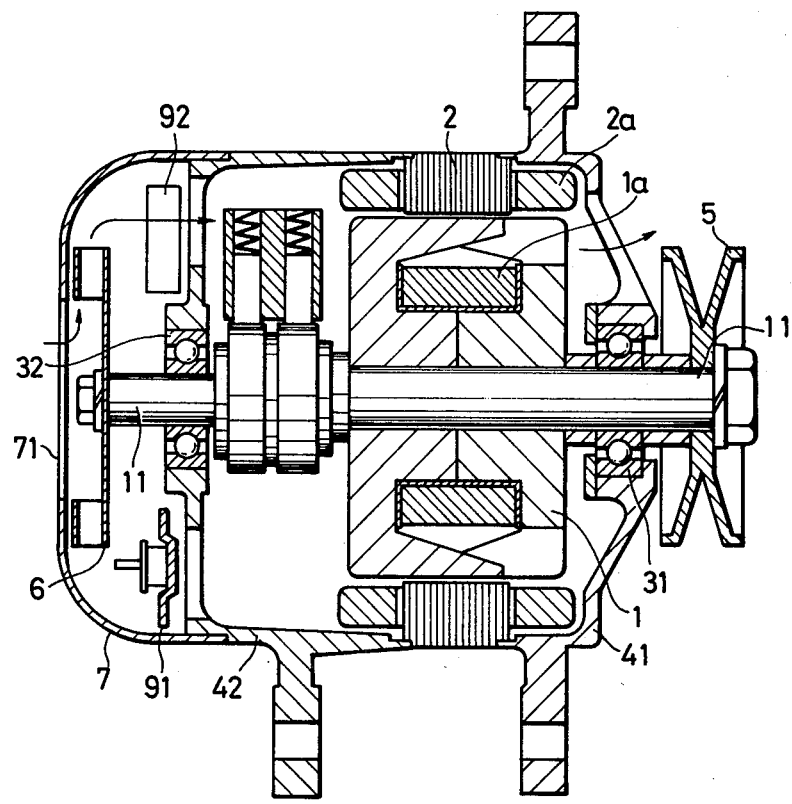
FIG. 1 is a side elevational view, in cross section, showing a conventional generator apparatus.
Figure 2:
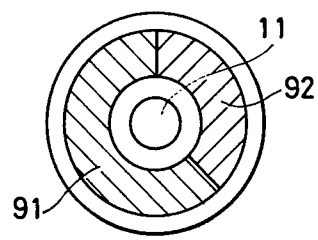
FIG. 2 is a schematic view showing the utilization area for the disposition of electrical components in the conventional apparatus.
Figure 3:
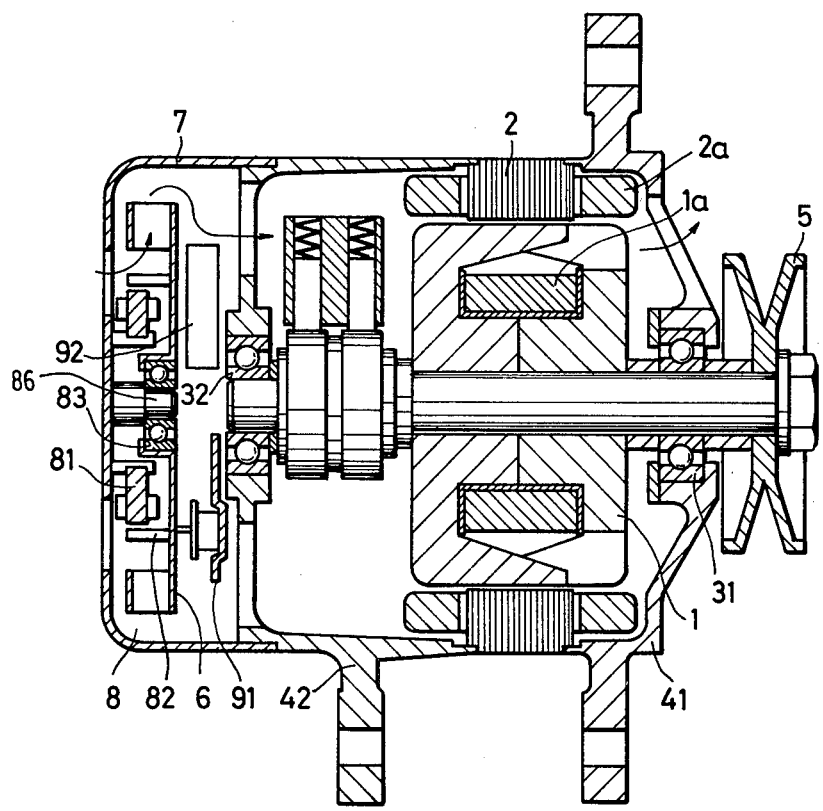
FIG. 3 is a side elevational view, in cross section, showing an embodiment of this invention.
Figure 5:
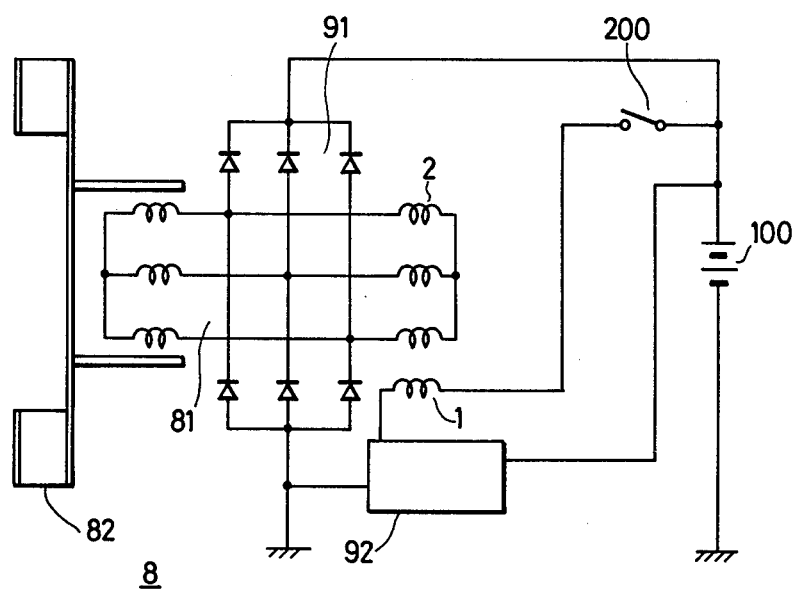
FIG. 5 is an electric circuit diagram of the embodiment of FIG. 3.

In FIG. 3, a three phase induction motor 8 is composed of a stator 81 having three phase windings and secured to the cover 7, an induction member 82 formed as a rotor disposed opposed to the stator 81 and secured to the fan 6, and a bearing 83 for rotatably supporting the member 82 and the fan 6 on a shaft 86. Shown in the circuit diagram of FIG. 5 are also a battery 100 and a key switch 200. Other elements are arranged the same as explained in FIG. 1. The stator 81 having the three phase windings is connected with the stator 2 of the AC generator electrically by a three phase connection.

Figure 4:
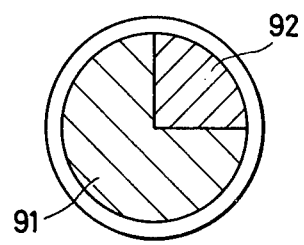
FIG. 4 is a schematic view explaining how the restriction in the disposition of the electrical components can be eliminated in the embodiment according to this invention.

When the rotor 1 is driven by way of the pulley 5 from an engine or like means, three phase AC power is generated in the armature coils 2a of the stator 2, whereby three phase electric power is supplied to the stator 81 of the motor connected electrically therewith to generate a rotating magnetic field. When the rotor 1 of the generator has 12 poles and the three phase windings of the stator 81 of the motor has four poles, for example, since they have a synchronized frequency in common, the synchronization speed for each is in proportion to the number of poles, by which the stator 81 of the motor has a magnetic field rotating at a speed three times as high as that in the rotor 1 of the generator. Accordingly, the member 82 disposed opposed to the stator 81 rotates at approximately the same speed as the rotating magnetic field with a light slip as known from electromagnetic theory. Accordingly, the cooling fan 6 to which the member 82 is secured rotates at a speed approximately three times the rotational speed of the generator. Thus, the fan 6 rotates at about 6000 rpm in a low rotational speed range of the generator of 2000 rpm, for example. This means that the same amount of cooling air obtainable at 6000 rpm in the conventional generator can be obtained at 2000 rpm, which significantly improves the cooling performance at low speeds. Further, since the rotor 1 of the generator and the cooling fan 6 are separated, the previously unusable space can be utilized and no consideration is necessary in the disposition of the rectifier 91 and the voltage regulator 92 regarding contact with the rotational shaft 11, as compared with conventional generators. FIG. 4 schematically shows the elimination of the restriction in the utilizable space in the generator according to this invention, in which the entire range can be utilized as shown by the hatched area.

As described above, according to this invention, since a three phase induction motor is mounted on a rotational shaft apart from the rotational shaft of the AC generator at the side opposite the pulley and is adapted to be rotatably driven by an input from a part of the three phase AC output induced in the armature coils, and the cooling fan is disposed on the rotor of the induction motor, the cooling performance at low speeds of the AC generator can be significantly improved. Further, since the rotor for the AC generator and the cooling fan can be separated, utilization of the space for mounting each of the components in the AC generator is improved as compared with the conventional apparatus.

What is claimed is:

1. An electric generator, comprising: a rotor mounted on a rotary shaft and having field coils, a stator opposed to said rotor with a slight radial gap therebetween and having armature coils generating a three phase AC output upon rotation of said rotor, driving means mounted at one end of said rotary shaft, an induction motor comprising a stator and an induction member formed as a rotor mounted on a further shaft on the side of said generator opposite said driving means, means responsive to a portion of said three phase AC output induced in said armature coils for rotationally driving said induction motor, a cooling fan disposed on said rotor of said induction motor for supplying cooling air to said generator stator and said generator rotor.

2. An electric generator as claimed in claim 1, wherein said induction motor is a three phase motor and said motor rotor is integral with said cooling fan.

3. An electric generator as claimed in claim 1, further including means for containing said generator rotor and said generator stator, and cover means for said motor mounted to said containing means.

4. An electric generator as claimed in claim 3, said cover means and said containing means defining air passages for the flow of said cooling air.

5. An electric generator as claimed in claim 1, said generator further including regulator means and rectifier means, said rotary shaft and said further shaft defining a space therebetween, said regulator means and said rectifier means being mountable within said space.

6. An electric generator as claimed in claim 1, said rotor of said induction motor being driven at a speed higher than but in proportion to the speed of said generator rotor.

* * * * *